US010767591B2

(12) United States Patent
Goto

(10) Patent No.: US 10,767,591 B2
(45) Date of Patent: Sep. 8, 2020

(54) ABNORMALITY DETERMINATION DEVICE FOR VARIABLE GEOMETRY TURBOCHARGER

(71) Applicant: MITSUBISHI HEAVY INDUSTRIES, LTD., Tokyo (JP)

(72) Inventor: Mitsufumi Goto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 614 days.

(21) Appl. No.: 15/540,402

(22) PCT Filed: Jan. 16, 2015

(86) PCT No.: PCT/JP2015/051006
§ 371 (c)(1),
(2) Date: Jun. 28, 2017

(87) PCT Pub. No.: WO2016/113889
PCT Pub. Date: Jul. 21, 2016

(65) Prior Publication Data
US 2018/0003121 A1 Jan. 4, 2018

(51) Int. Cl.
*F02D 41/22* (2006.01)
*F02B 37/24* (2006.01)
*F02B 39/16* (2006.01)
*F02B 37/22* (2006.01)

(52) U.S. Cl.
CPC ............ *F02D 41/221* (2013.01); *F02B 37/22* (2013.01); *F02B 37/24* (2013.01); *F02B 39/16* (2013.01); *Y02T 10/144* (2013.01); *Y02T 10/40* (2013.01)

(58) Field of Classification Search
CPC ........ F02D 41/221; F02B 37/22; F02B 37/24; F02B 39/16
See application file for complete search history.

(56) References Cited

U.S. PATENT DOCUMENTS

| 2003/0156439 A1* | 8/2003 | Ohmichi | ............... | H02M 7/538 363/98 |
| 2014/0271138 A1 | 9/2014 | Markyvech et al. | | |
| 2015/0354442 A1* | 12/2015 | Morelli | .................. | F02M 26/04 123/568.16 |

FOREIGN PATENT DOCUMENTS

DE 102007056557 A1 5/2009
JP 11-210483 A 8/1999
(Continued)

OTHER PUBLICATIONS

Office Action dated Feb. 16, 2018 issued to the corresponding Japanese Application No. 2016-569184 with a Machine Translation.

(Continued)

*Primary Examiner* — Ngoc T Nguyen
(74) *Attorney, Agent, or Firm* — Birch, Stewart, Kolasch & Birch, LLP

(57) ABSTRACT

The present application relates to an abnormality determination device for a variable geometry turbocharger having a nozzle mechanism capable of changing a flow path area of exhaust gas with an actuator. The abnormality determination device includes: a first detection part configured to be capable of detecting at least one of a load of the actuator or supply energy to the actuator; and a determination part configured to determine that an abnormality is present, if a detection result by the first detection part is out of an allowable range corresponding to an operational state of the variable geometry turbocharger.

8 Claims, 12 Drawing Sheets

(56) References Cited

FOREIGN PATENT DOCUMENTS

| | | |
|---|---|---|
| JP | 2003-148237 A | 5/2003 |
| JP | 2003-293784 A | 10/2003 |
| JP | 2007-113427 A | 5/2007 |
| JP | 2011-2202689 A | 11/2011 |
| JP | 2014-114741 A | 6/2014 |
| KR | 10-0986364 B1 | 10/2010 |

OTHER PUBLICATIONS

Chinese Office Action and Search Report for Chinese Application No. 201580072617.7, dated Nov. 1, 2018, with partial English translation.

Extended European Search Report for European Application 15877841.5, dated Jun. 22, 2018, is provided.

European Communication pursuant to Article 94(3) EPC for European Application No. 15877841.5, dated Oct. 23, 2019.

Chinese Office Action and Search Report, dated May 13, 2019, for Chinese Application No. 201580072617.7, with an English translation.

International Preliminary Report on Patentability and Written Opinion of the International Searching Authority (Forms PCT/IB/338, PCT/IB/373, PCT/ISA/237 and PCT/IB/326) issued in International Application No. PCT/JP2015/051006, dated Jul. 27, 2017, with an English translation.

International Search Report and Written Opinion of the International Searching Authority (Forms PCT/ISA/210, PCT/ISA/220 and PCT/ISA/237) issued in International Application No. PCT/JP2015/051006, dated Apr. 21, 2015.

* cited by examiner

ABNORMALITY DETERMINATION DEVICE FOR VARIABLE GEOMETRY TURBOCHARGER

TECHNICAL FIELD

The present disclosure relates to an abnormality determination device for a variable geometry turbocharger including an actuator-driven nozzle mechanism.

BACKGROUND ART

In a variable geometry turbocharger (VGT), the supercharging efficiency is improved by changing the area of an exhaust flow passage in an exhaust turbine in accordance with the rotation speed of the engine to control the exhaust flow rate to the exhaust turbine blade. Such a control on the area of an exhaust flow passage is performed by driving a nozzle mechanism with an actuator. For instance, if the engine rotation speed is relatively low, the area of the exhaust flow passage is narrowed (reduced) with the nozzle mechanism to increase the flow rate of exhaust gas and increase the output torque. If the engine rotation speed is relatively high, the area of the exhaust flow passage is expanded (increased) by opening (increasing) the nozzle mechanism to improve the fuel consumption.

Meanwhile, if a trouble like sticking occurs in a nozzle mechanism, which is an important constituent element of a variable geometry turbocharger, it is no longer possible to adjust (narrow or expand) the area of an exhaust flow passage as described above. To prevent such troubles, it is important to detect at an early stage an abnormality such as a trouble in a nozzle mechanism and a behavior that seems to develop a trouble.

As a technique related to abnormality detection of such a type of variable geometry turbocharger, Patent Document 1 discloses, for instance, performing a wiping motion that drives a nozzle mechanism from a full-open position to a full-closed position when the engine is stopped, and detecting an abnormality on the basis of the time required for the wiping motion.

CITATION LIST

Patent Literature

Patent Document 1: JP2011-220289A

SUMMARY

Problems to be Solved

However, the abnormality detection in Patent Document 1 requires intentional driving of the nozzle mechanism, and can be performed only when the engine is stopped. In other words, the abnormality detection cannot be performed while the engine is in operation, thus failing to sufficiently meet the demand to detect an abnormality of a nozzle mechanism at an early stage with high accuracy.

At least one embodiment of the present invention was made in view of the above described problem, and an object is to provide an abnormality determination device for a variable geometry turbocharger whereby it is possible to detect an abnormality of a nozzle mechanism at an early stage with high accuracy.

Solution to the Problems (1) An abnormality determination device according to at least one embodiment of the present invention is for a variable geometry turbocharger having a nozzle mechanism capable of changing a flow path area of exhaust gas with an actuator, and comprises: a first detection part configured to be capable of detecting at least one of a load of the actuator or supply energy to the actuator; and a determination part configured to determine that an abnormality is present, if a detection result by the first detection part is out of an allowable range corresponding to an operational state of the variable geometry turbocharger.

With the above configuration (1), presence or absence in the variable geometry turbocharger is determined on the basis of whether at least one of the load of the actuator or the supply energy to the actuator is out of an allowable range. The allowable range used as a determination criteria is set corresponding to the operational state of the variable geometry turbocharger, and thus it is possible to determine an abnormality accurately at an early stage for various operational states of a vehicle to which the variable geometry turbocharger is mounted.

(2) In some embodiments, in the above configuration (1), the abnormality determination device further comprises: a second detection part configured to detect the operational state of the variable geometry turbocharger; and a storage part configured to store a map which defines a relationship between the operational state of the variable geometry turbocharger and the allowable range. The determination part is configured to set the allowable range corresponding to the operational state detected by the second detection part on the basis of the map.

With the above configuration (2), a map is stored in advance, defining a relationship between the operational state of the variable geometry turbocharger and the allowable range, and thereby the determination part can set a suitable allowable range corresponding to the operational state of the variable geometry turbocharger by referring to the map.

(3) In some embodiments, in the above configuration (2), the map comprises a plurality of maps prepared corresponding to an opening degree of the nozzle mechanism.

With the above configuration (3), the map comprises a plurality of maps prepared corresponding to an opening degree of the nozzle mechanism, for setting the allowable range, and thereby it is possible to build maps that can define an allowable range that correspond to various operational states thoroughly.

(4) In some embodiments, in any one of the above configurations (1) to (3), the first detection part is configured to detect both of the load of the actuator and the supply energy to the actuator. The determination part is configured to determine that an abnormality is present in an energy supply path to the actuator, if the load of the actuator is small with respect to the supply energy to the actuator as compared to a target value corresponding to the supply energy.

With the above configuration (4), abnormality determination is performed on the basis of both of the load of the actuator and the supply energy to the actuator, and thus it is possible to perform even more accurate determination. In particular, if the load (output energy) of the actuator is small compared with a target value corresponding to the supply energy (input energy) (that is, the target value being an output expected from an input), it can be determined that there is a risk of an abnormality such as leakage of supply energy, and thus there is an abnormality in the energy supply path to the actuator.

(5) In some embodiments, in any one of the above configurations (1) to (4), the abnormality determination device further comprises: a housing to which a reaction force of the actuator is applicable; and a piezoelectric element interposed between the actuator and the housing. The first detection part is configured to detect the load of the actuator on the basis of an output voltage of the piezoelectric element.

With the above configuration (5), a reaction force applied to a housing when the actuator is driven is detected as an output voltage of a piezoelectric element interposed between the actuator and the housing. Accordingly, it is possible to obtain a load of the actuator efficiently as an electric signal.

(6) In some embodiments, in the above configuration (5), the actuator is connected to the nozzle mechanism via a rod member configured to be drivable along an axial direction. The piezoelectric element is disposed on an opposite side from a side of the actuator to which the rod member is connected.

With the above configuration (6), a reaction force is most likely to be applied to the housing from the actuator at the opposite side to the side of the actuator with the driving rod connected thereto, and thereby disposing the piezoelectric element in the above position makes it possible to detect a load of the actuator accurately.

(7) In some embodiments, in any one of the above configurations (1) to (6), the abnormality determination device further comprises an energy sensor disposed in an energy supply path connecting an energy supply source and the actuator. The first detection part is configured to detect the supply energy on the basis of a detection value of the energy sensor.

With the above configuration (7), the energy sensor is disposed in the energy supply path connecting the energy supply source and the actuator, and thus it is possible to detect supply energy to the actuator.

(8) In some embodiments, in any one of the above configurations (1) to (7), the operational state is determined including at least one of a boost pressure of the variable capacity turbocharger or the load of the actuator.

(9) In some embodiments, in any one of the above configurations (1) to (8), the supply energy is one of electric energy or pressure energy.

(10) In some embodiments, in any one of the above configurations (1) to (9), the abnormality determination device further comprises a transmission part for sending a determination result by the determination part to a control unit for controlling an engine supercharged by the variable geometry turbocharger.

With the above configuration (10), a determination result by the determination part is transmitted to a control unit for controlling the engine, and thus it is possible to provide components related to the above abnormality determination as separate members from the control unit of the engine. Accordingly, it is possible to reduce the computation load of the control unit, and thus it is possible to increase the processing speed and to reduce the costs.

Advantageous Effects

According to at least one embodiment of the present invention, it is possible to provide an abnormality determination device for a variable geometry turbocharger whereby it is possible to detect an abnormality of the nozzle mechanism accurately at an early stage.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
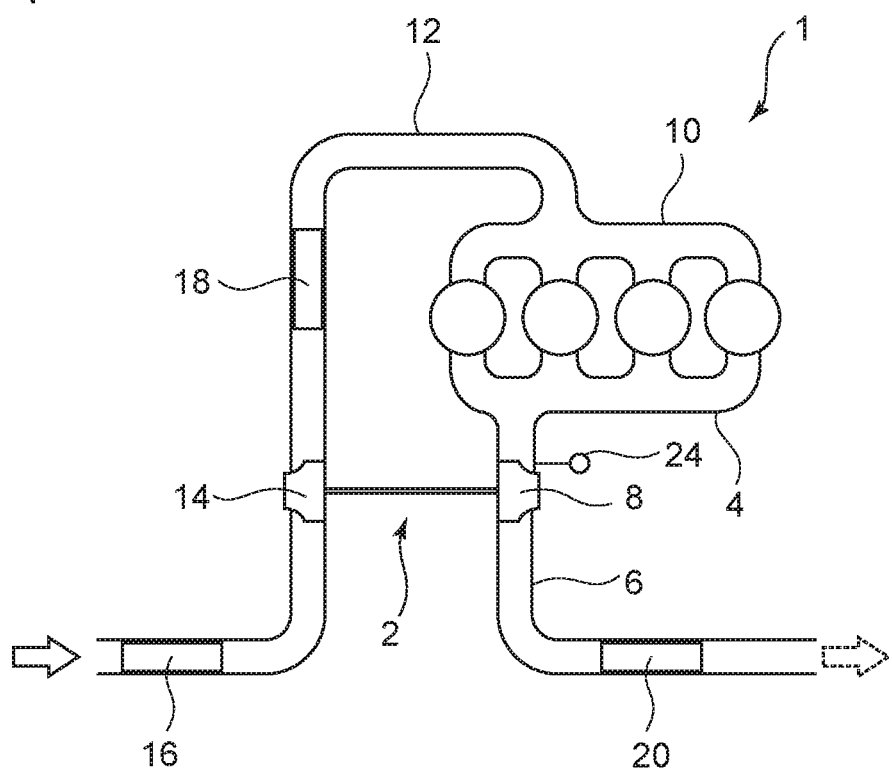
FIG. 1 is a schematic overall configuration diagram of an engine including a turbocharger according to an embodiment of the present invention.

With reference to FIG. 1, the overall configuration of a diesel engine (hereinafter, referred to as "engine") 1 including a variable geometry turbocharger (hereinafter, "turbocharger") 2 according to an embodiment of the present invention will be described. FIG. 1 is a schematic overall configuration diagram of the engine 1 including the turbocharger 2 according to an embodiment of the present invention.

The turbocharger 2 includes an exhaust turbine 8 disposed in an exhaust pipe 6 connected to an exhaust manifold 4, and a compressor 14 disposed in an intake pipe 12 connected to an intake manifold 10. The exhaust turbine 8 and the compressor 14 are coupled to each other, and when the exhaust turbine 8 is driven by exhaust gas of the engine 1, the compressor 14 coupled to the exhaust turbine 8 is driven to compress and supply intake air (supercharging).

Further, an air cleaner 16 for purifying supply air is disposed in the vicinity of the inlet of the intake pipe 12. An inter cooler 18 for cooling the supply air compressed and heated by the compressor 14 is disposed in the intake pipe 12, at the downstream side of the compressor 14. A muffler 20 for canceling noise is disposed in the vicinity of the outlet of the exhaust pipe 6.

The turbocharger 2 is a variable geometry turbocharger equipped with a nozzle mechanism 22 including nozzle vanes provided for the exhaust turbine 8, the nozzle vanes having an opening degree which is variable in response to the engine rotation speed. The nozzle mechanism 22 is configured such that the opening degree is adjustable by an actuator 56 that can be driven by utilizing electric energy or pressure energy, for instance.

The nozzle mechanism 22 is provided with an opening degree sensor 24 for detecting an opening degree θ.

Figure 2:
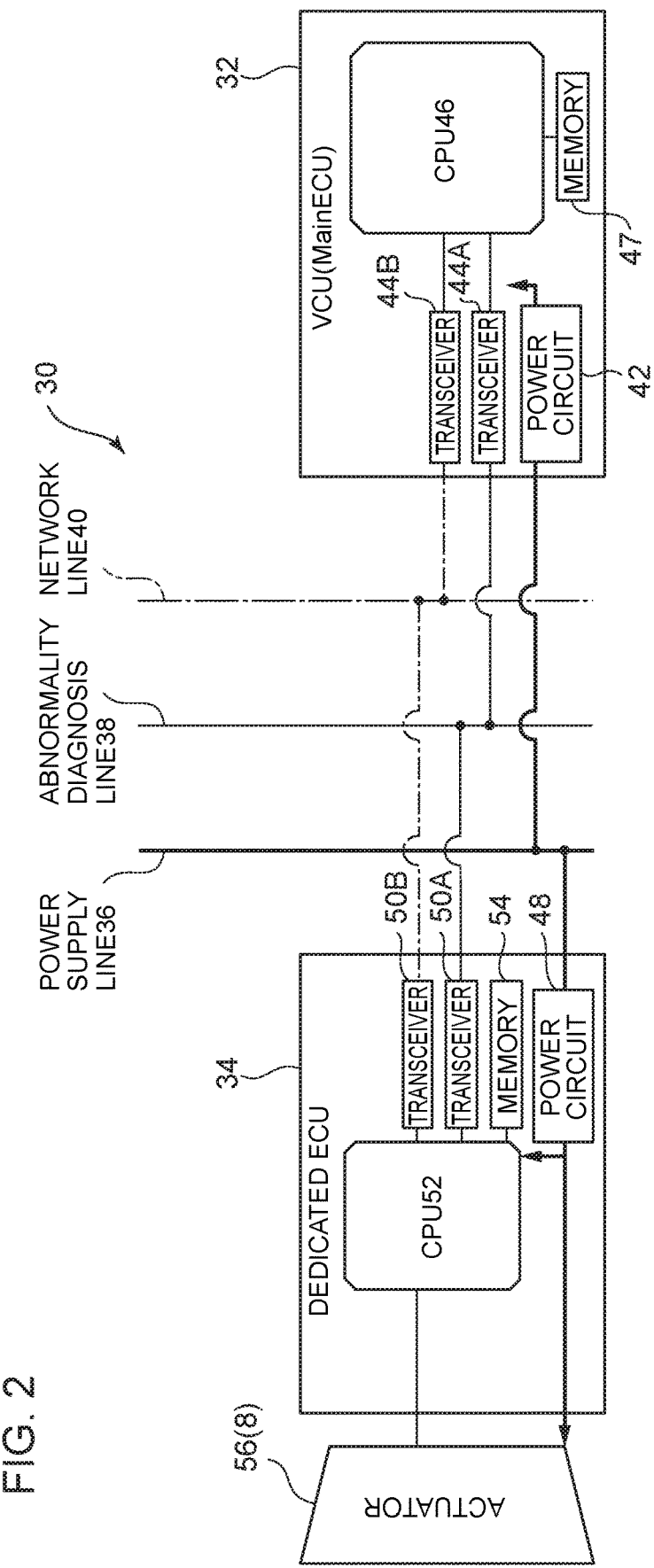
FIG. 2 is a schematic diagram showing a configuration of a control system mounted to the engine in FIG. 1.
Figure 3:
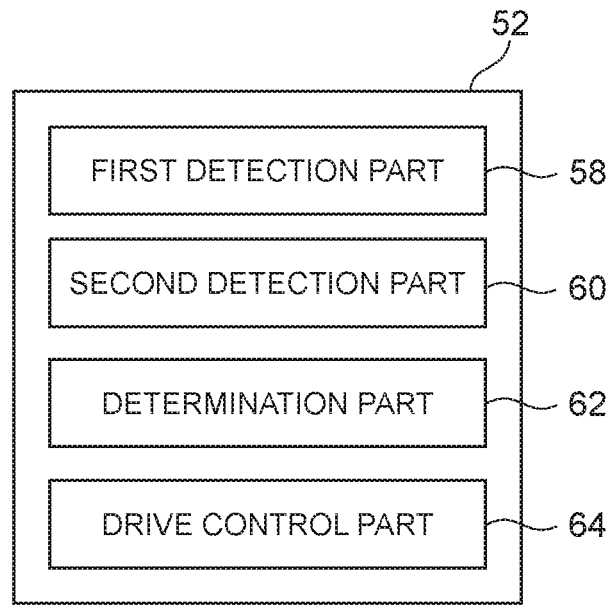
FIG. 3 is a block diagram functionally illustrating an interior configuration of a dedicated ECU in the control system of FIG. 2.

Next, with reference to FIG. 2, a control system 30 of the engine 1 having the above configuration will be described. FIG. 2 is a schematic configuration diagram of the control system 30 of the engine 1. FIG. 3 is a functional block diagram of the interior configuration of a dedicated ECU 34 in the control system 30 of FIG. 2.

The control system 30 includes: a main ECU 32 which integrally processes various controls for the entire vehicle, including the engine 1; a dedicated ECU 34 which processes local controls related to the turbocharger 2; a power supply line 36 for supplying driving power to the control system 30; an abnormality diagnosis line 38 for transmitting and receiving signals related to abnormality diagnosis in the turbocharger 2; and a network line 40 for transmitting and receiving control signals between the control system 30 and an external device.

For the network line 40, the CAN communication system is employed to improve the reliability.

The main ECU 32 includes: a power circuit 42 which distributes driving power supplied from the power supply line 36 to each part of the main ECU 32; transceivers 44A and 44B for transmitting and receiving various signals to and from the abnormality diagnosis line 38 and the network line 40; a CPU 46 which serves as a computational processing unit that performs various computational processes; and a memory 47 capable of storing data or the like used for various processes performed by the CPU 46.

The dedicated ECU 34 includes: a power circuit 48 which distributes driving power supplied from the power supply line 36 to each part of the dedicated ECU 34; transceivers 50A and 50B for transmitting and receiving various signals to and from the abnormality diagnosis line 38 and the network line 40, respectively; a CPU 52 which serves as a computational processing unit that performs various computational processes for the dedicated ECU 34; and a memory 54 capable of storing information or the like used for various processes performed by the CPU 52.

As described above, the control system 30 is of a central control type, in which the main ECU 32 performs processing computation related to the entire vehicle, while the dedicated ECU 34 performs local controls related to the turbocharger 2. Accordingly, processing loads of the main ECU 32 are reduced.

Next, the interior configuration of the CPU 52 of the dedicated ECU 34 will be described in terms of function. As shown in FIG. 3, the CPU 52 includes: a first detection part 58 configured to be capable of detecting at least one of a load of the actuator 56 or supply energy to the actuator 56; a second detection part 60 configured to detect the operational state of the turbocharger 2; a determination part 62 configured to determine presence or absence of an abnormality; and a drive control part 64 which performs a drive control of the actuator 56. In the present embodiment, the following abnormality determination control is performed through the above configuration. Hereinafter, an embodiment will be described in more detail.

First Example

Figure 4:
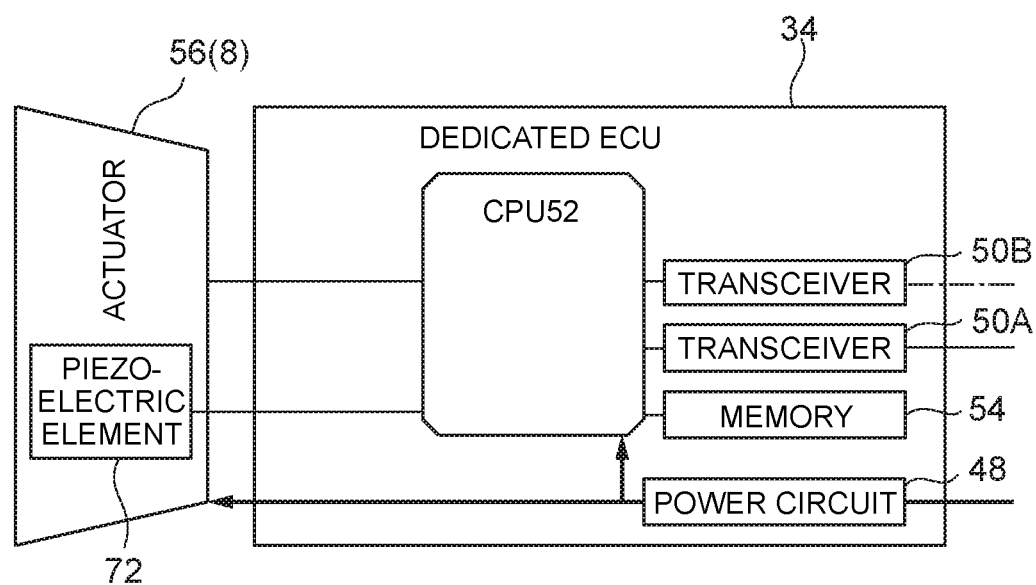
FIG. 4 is a schematic diagram of a configuration of a dedicated ECU according to the first embodiment.
Figure 5:
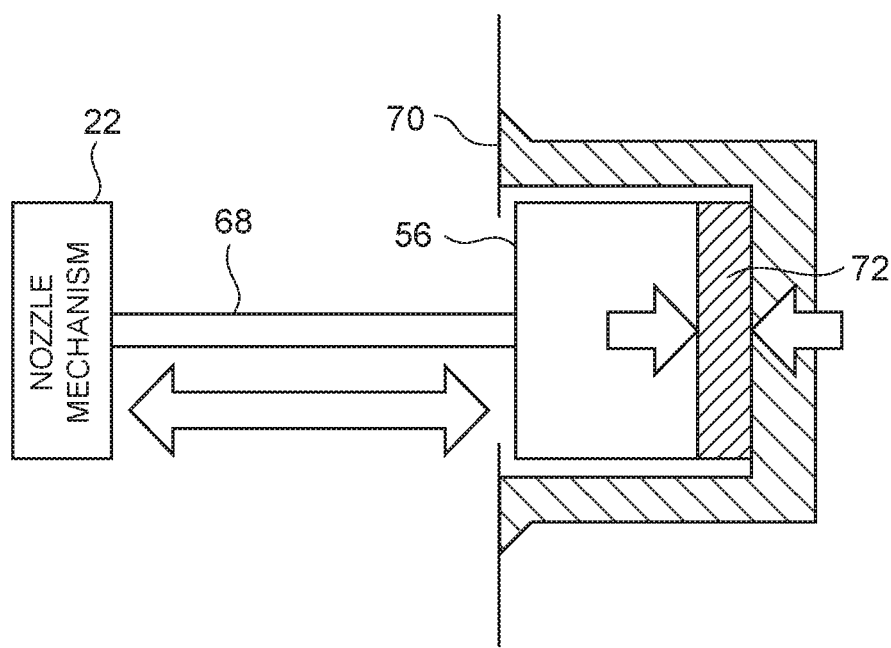
FIG. 5 is a schematic diagram showing a structural example for detecting a load of an actuator.
Figure 6:
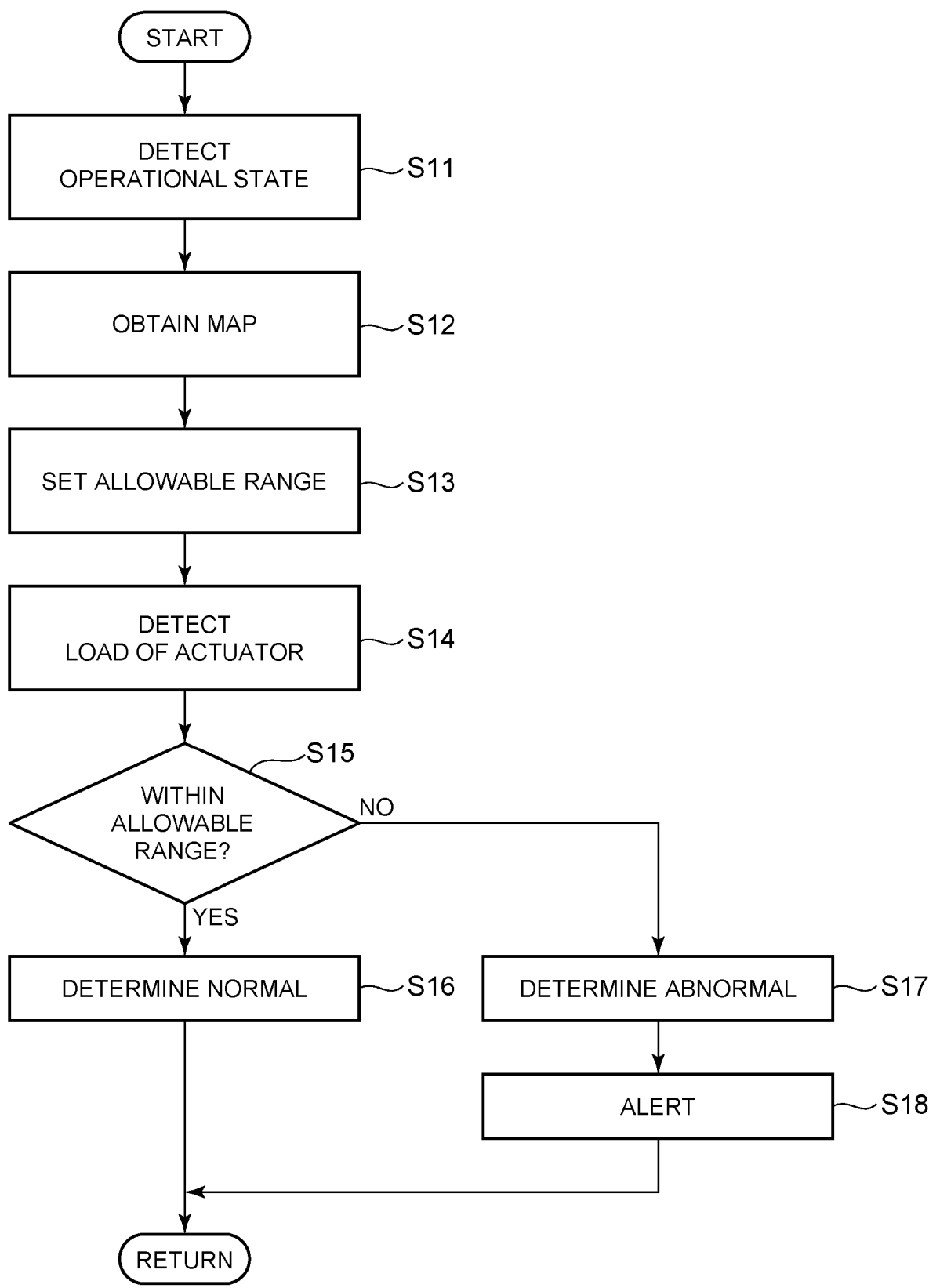
FIG. 6 is a flowchart showing steps of an abnormality determination control according to the first embodiment.
Figure 7:
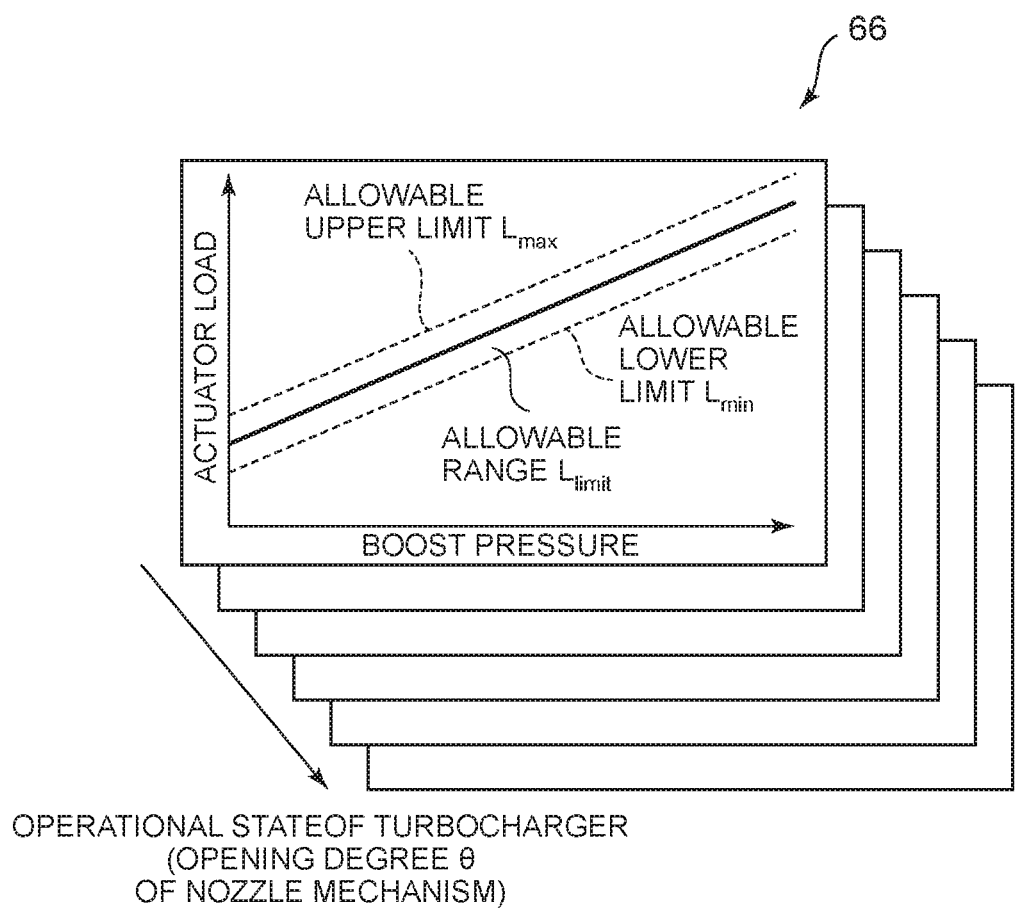
FIG. 7 is an example of a map stored in advance in the memory of FIG. 4.

With reference to FIGS. 4 to 7, an abnormality determination control according to the first embodiment will be described. FIG. 4 is a schematic diagram of a configuration of the dedicated ECU 34 according to the first embodiment. FIG. 5 is a schematic diagram showing an exemplary structure for detecting a load of the actuator 56. FIG. 6 is a flowchart showing the abnormality determination control according to the first embodiment by steps. FIG. 7 is an example of a map 66 stored in advance in the memory 54 in FIG. 4.

In the following description, the same features in the above description are associated with the same reference numerals, and not described again unless necessary.

In the first embodiment, a load of the actuator 56 is detected, and abnormality determination is performed on the basis of the detection result. The actuator 56 is, for instance, a motor (electric motor) which can be driven by driving power (electric energy) supplied from the power circuit 48. In the example of FIG. 5, rotational motion of the motor is converted into reciprocating motion by a non-depicted power transmission mechanism, and then transmitted to a driving rod 68. The nozzle mechanism 22 is configured such that the opening degree of the nozzle mechanism 22 is variable through the reciprocating motion of the driving rod 68 described above.

As depicted in FIG. 5, the actuator 56 is housed inside a housing 70 formed so as to surround the vicinity of the actuator 56. The actuator 56 is surrounded by the housing 70 at three sides, and the driving rod 68 is connected to an open side of the actuator 56. A piezoelectric element 72 for detecting loads is disposed between the actuator 56 and the housing 70. The piezoelectric element 72 detects a reaction force generated between the actuator 56 and the housing 70 when the actuator 56 is driven, and outputs a voltage signal corresponding to the reaction force. The CPU 34 (the first detection part 58) obtains the voltage signal outputted from the piezoelectric element 72 as described above, and thereby is capable of detecting loads of the actuator 56.

Particularly in the present embodiment, the piezoelectric element 72 is disposed opposite from a side of the actuator 56 to which the driving rod 68 is connected. A reaction force is most likely to be applied to the housing 70 from the actuator 56 at the opposite side to the side of the actuator 56 with the driving rod 68 connected thereto. Thus, with the piezoelectric element 72 disposed in the above described position, it is possible to detect loads of the actuator 56 accurately.

Next, with reference to FIG. 6, an abnormality determination method performed on the basis of the above configuration will be described.

The second detection part 60 obtains a detection signal from the opening degree sensor 24, and thereby detects an operational state of the turbocharger 2 (step S11).

Next, the dedicated ECU 34 accesses the memory 54 and thereby obtains the map 66 stored in the memory 44 in advance (step S12). FIG. 7 is a diagram showing an example of the map 66. An allowable range $L_{limit}$ (allowable upper limit $L_{max}$ and allowable lower limit $L_{min}$) is defined for each opening degree θ of the nozzle mechanism 22 which represents the operational state of the turbocharger 2, with regard to the relationship between the boost pressure of the turbocharger 2 and the load. The determination part 62 sets an allowable range $L_{limit}$ (allowable upper limit $L_{max}$ and allowable lower limit $L_{min}$) corresponding to the operational state detected in step S11, on the basis of the map 66 obtained in step S12 (step S13).

The first detection part 58 obtains the voltage signal of the piezoelectric element 72, and detects a load of the actuator 56 (step S14). It is determined whether the load of the actuator detected in step 14 is within the allowable range $L_{limit}$ set in step S13 (step S15). As a result of the determination, if the load of the actuator 56 is within the allowable range $L_{limit}$ (step S15: YES), the determination part 62 performs normal determination (step S16). If the load of the actuator 56 is not within the allowable range $L_{limit}$ (step S15: NO), the determination part 62 performs abnormality determination (step S17), and issues an alert for notifying the abnormality (S18).

As described above, according to the first embodiment, the piezoelectric element 72 detects a load of the actuator 56, and abnormality is determined on the basis of whether the detection result is within the allowable range $L_{limit}$ set in accordance with the operational state. The above abnormality determination can be performed whether or not the engine 1 is in operation, and thus it is possible to detect abnormality of the nozzle mechanism 22 accurately at an early stage.

Second Example

Figure 8:
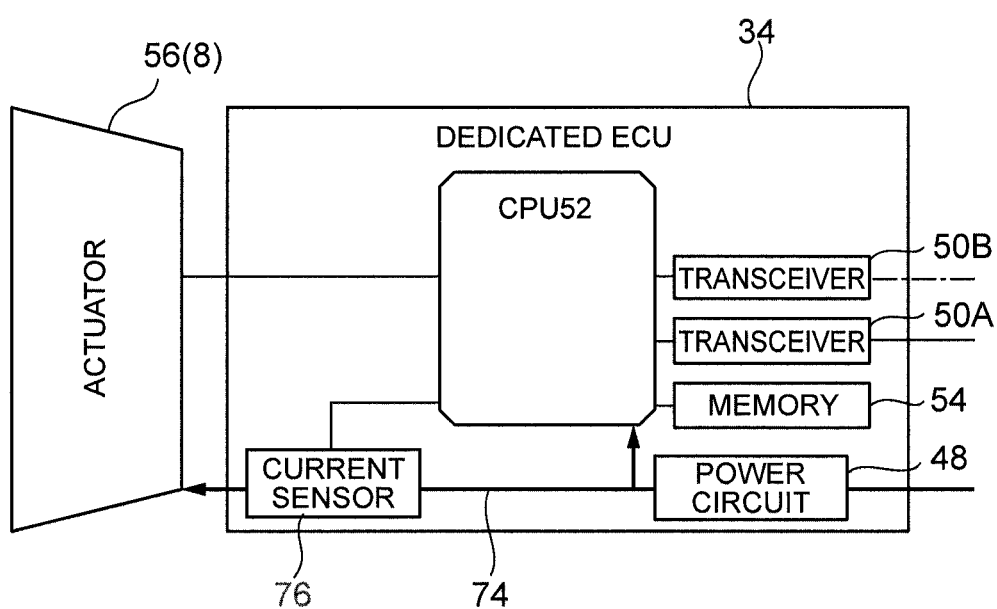
FIG. 8 is a block diagram of the configuration of a dedicated ECU according to the second embodiment.
Figure 9:
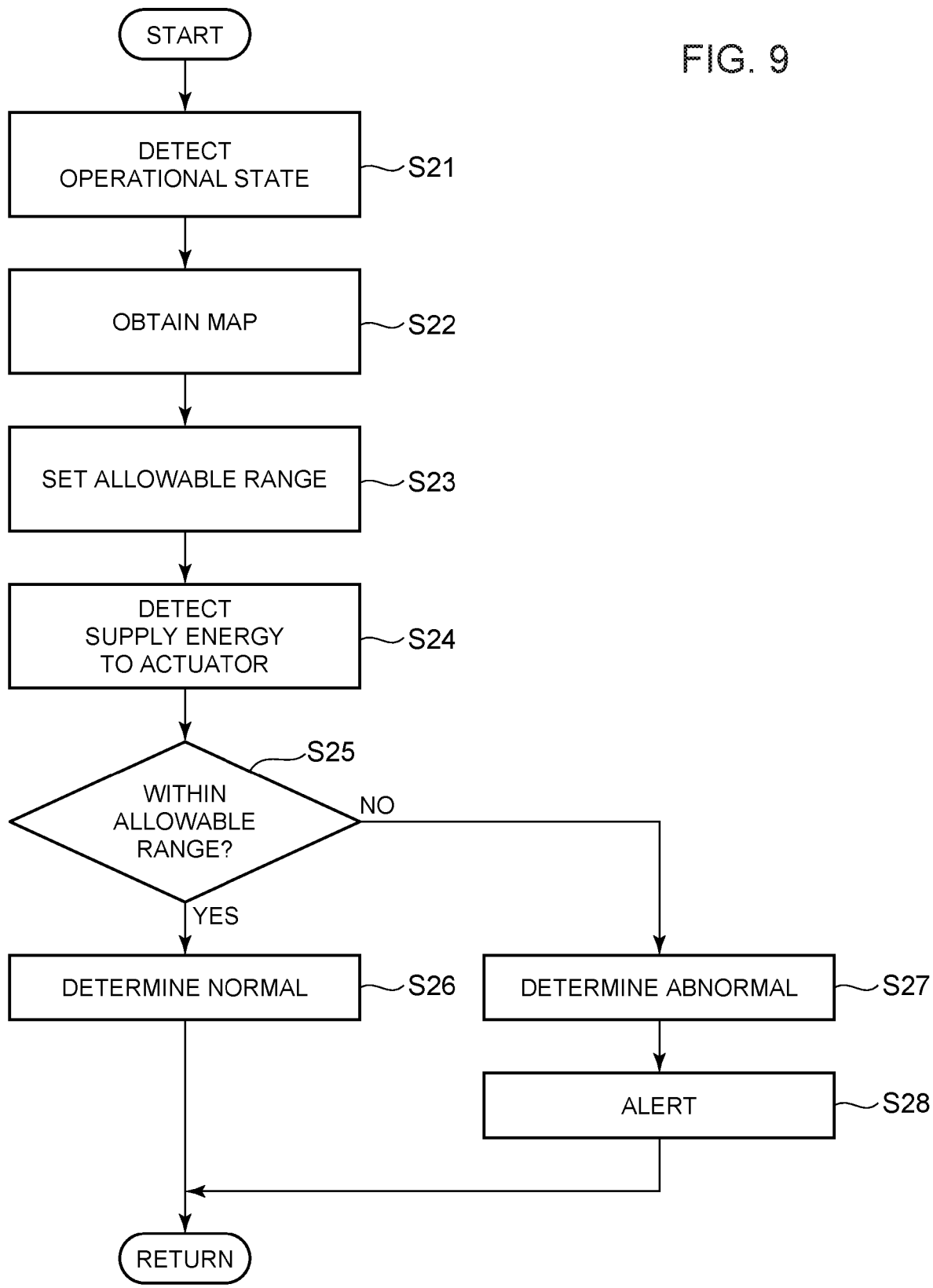
FIG. 9 is a flowchart showing steps of an abnormality determination control performed by the dedicated ECU in FIG. 8.
Figure 10:
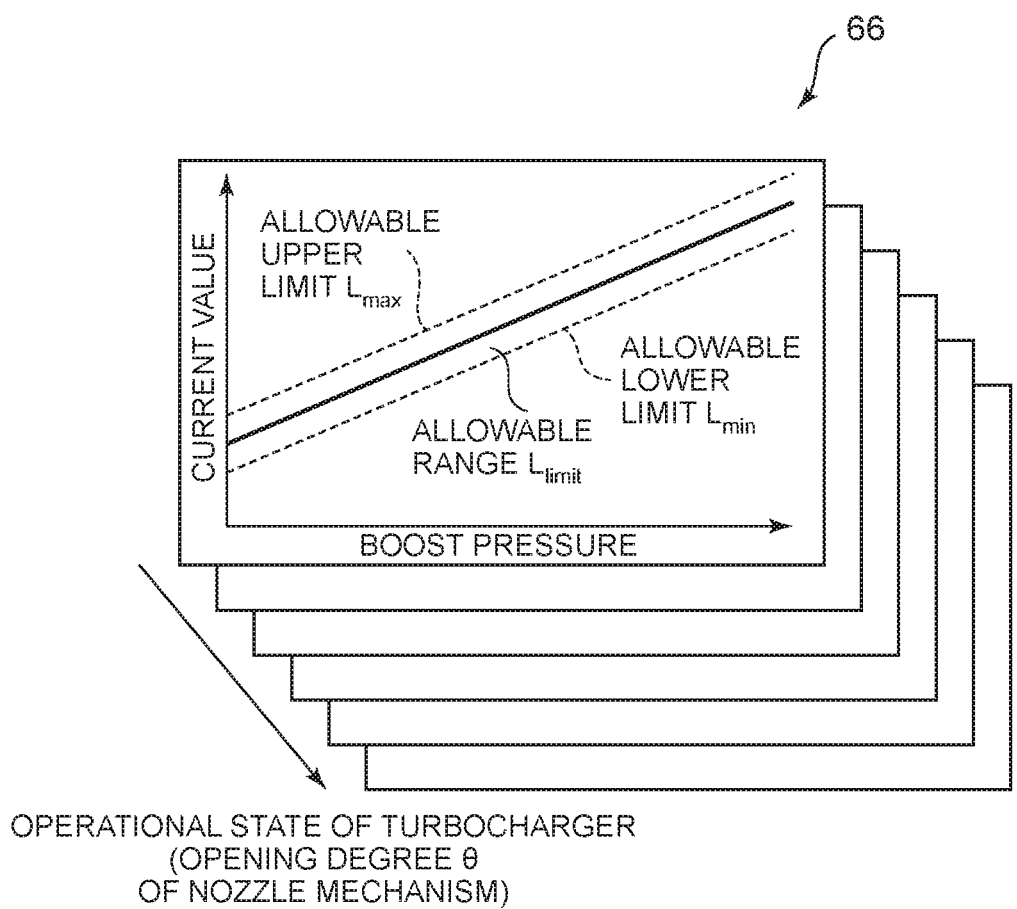
FIG. 10 is an example of a map stored in advance in the memory of FIG. 8.

With reference to FIGS. 8 and 9, an abnormality determination control according to the second embodiment will now be described. FIG. 8 is a block configuration diagram of the dedicated ECU 34 according to the second embodiment. FIG. 9 is a flowchart showing the abnormality determination control performed by the dedicated ECU 34 in FIG. 8 by steps. FIG. 10 is an example of a map 78 stored in advance in the memory 54 in FIG. 8.

As depicted in FIG. 8, in the second embodiment, the dedicated ECU 34 is provided with a current sensor 76 disposed in the power supply line 74 for supplying driving power to the actuator 56 from the power circuit 48, to detect a current value of electric current that flows through the power supply line 74. Accordingly, the CPU 52 can monitor a consumption power value (i.e., supply energy) in the actuator 56 on the basis of the detection value of the current sensor 76.

Next, with reference to FIG. 9, an abnormality determination method performed on the basis of the above configuration will now be described.

The second detection part 60 obtains a detection signal from the opening degree sensor 24, and thereby detects an operational state of the turbocharger 2 (step S21). Next, the dedicated ECU 34 accesses the memory 54 and thereby obtains the map 66 stored in advance in the memory 54 (step S22).

FIG. 10 is a diagram showing an example of the map 78. An allowable range $L_{limit}$ (allowable upper limit $L_{max}$ and allowable lower limit $L_{min}$) is defined for each opening degree θ of the nozzle mechanism 22 which represents the operational state of the turbocharger, with regard to the relationship between the boost pressure of the turbocharger and the current value. The determination part 62 sets an allowable range $L_{limit}$ (allowable upper limit $L_{max}$ and allowable lower limits $L_{min}$) corresponding to the operational state detected in step S11, on the basis of the map 66 obtained in step S12 (step S23).

The first detection part 58 obtains the signal of the current sensor 76, and detects supply energy (electric energy) to the actuator 56 (step S24). It is determined whether the supply energy to the actuator detected in step 24 is within the allowable range $L_{limit}$ set in step S23 (step S25). As a result of the determination, if the supply energy of the actuator 56 is within the allowable range $L_{limit}$ (step S25: YES), the determination part 62 performs normal determination (step S26). If the supply energy to the actuator 56 is not within the allowable range $L_{limit}$ (step S25: NO), the determination part 62 performs abnormality determination (step S27), and issues an alert for notifying the abnormality (S28).

As described above, according to the second embodiment, the current sensor 76 detects supply energy (electric energy) to the actuator 56, and abnormality is determined on the basis of whether the detection result is within the allowable range $L_{limit}$ set in accordance with the operational state. The above abnormality determination can be performed whether or not the engine 1 is in operation, and thus it is possible to detect abnormality of the nozzle mechanism 22 accurately at early stage.

Third Example

Figure 11:
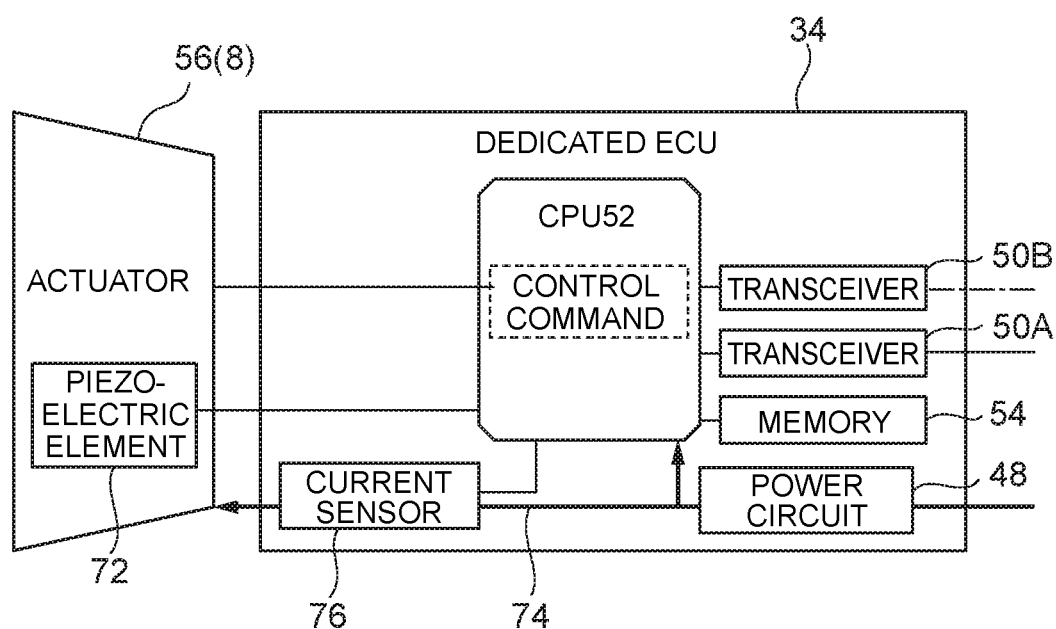
FIG. 11 is a block diagram of the configuration of a dedicated ECU according to the third embodiment.
Figure 12:
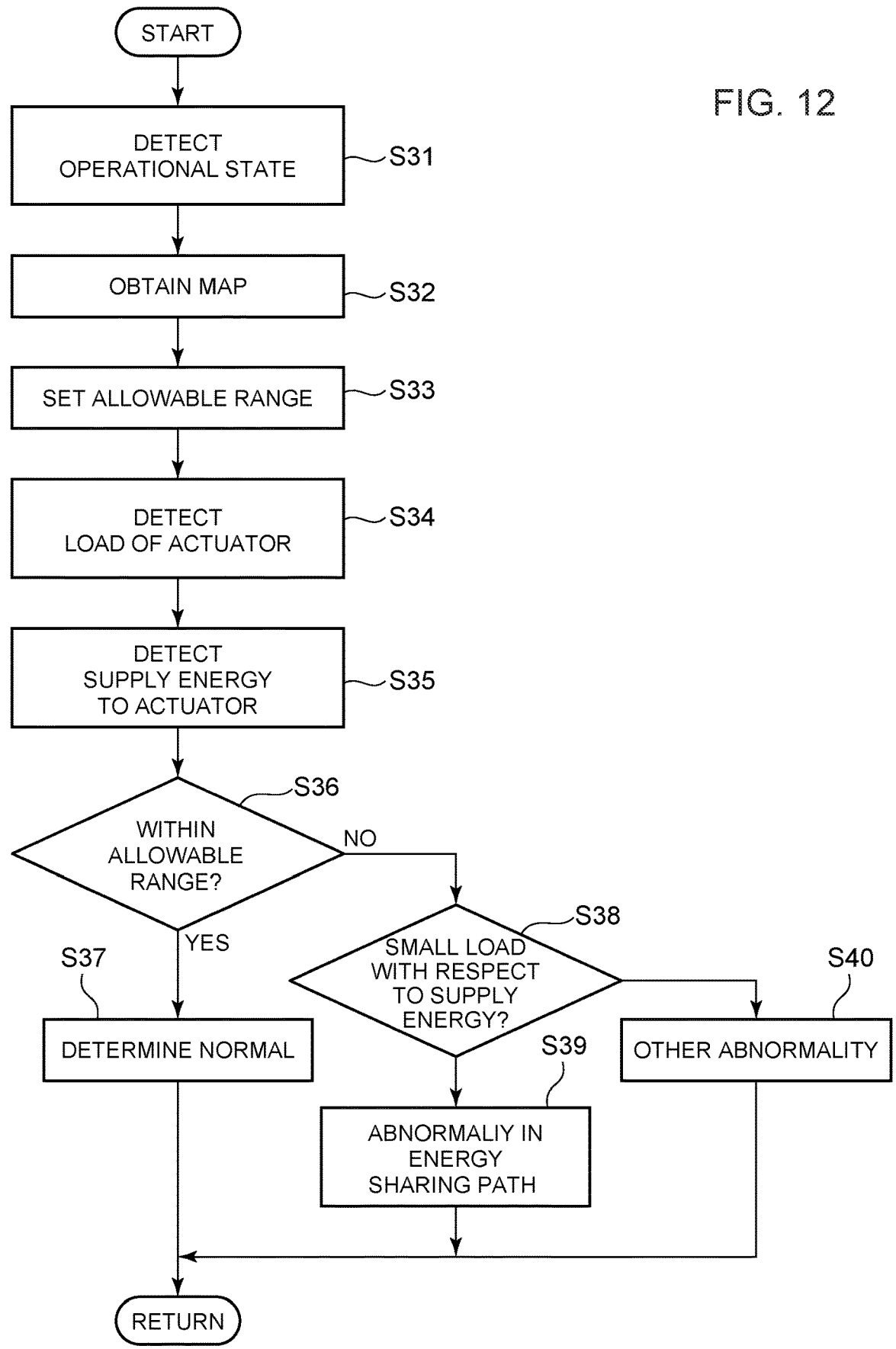
FIG. 12 is a flowchart showing steps of an abnormality determination control performed by the dedicated ECU in FIG. 11.

Subsequently, with reference to FIGS. 11 and 12, the third embodiment will be described. FIG. 11 is a block configuration diagram of the dedicated ECU 34 according to the third embodiment. FIG. 12 is a flowchart showing the abnormality determination control performed by the dedicated ECU 34 in FIG. 11 by steps.

As depicted in FIG. 11, in the third embodiment, a load of the actuator 56 can be detected by the piezoelectric element 72 similarly to the first embodiment, and supply energy to the actuator 56 can be detected by the current sensor 76 similarly to the second embodiment. Accordingly, the CPU 52 can perform abnormality determination on the basis of the detection values of both of the piezoelectric element 72 and the current sensor 76.

Next, with reference to FIG. 12, an abnormality determination method performed on the basis of the above configuration will be described.

The second detection part 60 obtains a detection signal from the opening degree sensor 24, and thereby detects an operational state of the turbocharger 2 (step S31). Next, the dedicated ECU 34 accesses the memory 54 and thereby obtains the maps 66, 78 stored in the memory 54 in advance (step S32). The maps 66, 78 are similar to those shown in FIGS. 7 and 10, and each defines an allowable range $L_{limit}$ (allowable upper limit $L_{max}$ and allowable lower limit $L_{min}$) for each opening degree θ of the nozzle mechanism 22 which represents the operational state of the turbocharger 2, with regard to the relationship between the boost pressure of the turbocharger 2 and the load or the current value. The determination part 62 sets an allowable range $L_{limit}$ (allowable upper limit $L_{max}$ and allowable lower limit $L_{min}$) corresponding to the operational state detected in step S31, on the basis of the maps 66, 78 obtained in step S32 (step S33).

The first detection part 58 obtains the signal from the piezoelectric element 72 to detect a load of the actuator 56 (step S34), and also obtains the signal from the current sensor 76 to detect supply energy to the actuator 56 (step S35). It is determined whether the load of the actuator 56 detected in step S34 and the supply energy to the actuator detected in step 35 are both within the allowable range $L_{limit}$ set in step S33 (step S36). If the determination result is true (step S36: YES), the determination part 62 performs normal determination (step S37).

If the determination result is false (step S36: NO), the determination part 62 further determines whether the load is small with respect to the supply energy (step S38). Specifically, the determination part 62 determines whether the load of the actuator 56 detected in step S34 is smaller than a load that is expected from the supply energy to the actuator 56 detected in step S35. If the determination result is true (step S38: YES), the determination part 62 determines that supply energy is not normally supplied to drive the actuator 56 and there is an abnormality (e.g. short circuit or leakage) in the energy supply path (step S39). If the determination result is false (step S38: NO), the determination part 62 determines that there is an abnormality of another type (step S40).

As described above, according to the third embodiment, abnormality determination is performed on the basis of both of the load of the actuator 56 and the supply energy to the actuator 56, and thus it is possible to perform determination even more accurately. In particular, if the load (output energy) of the actuator 56 is small compared with a target value corresponding to the supply energy (input energy) (that is, the target value being an output expected from an input), it can be determined that there is a risk of an abnormality such as leakage of supply energy and thus there is an abnormality in the energy supply path to the actuator 56.

Fourth Example

Figure 13:
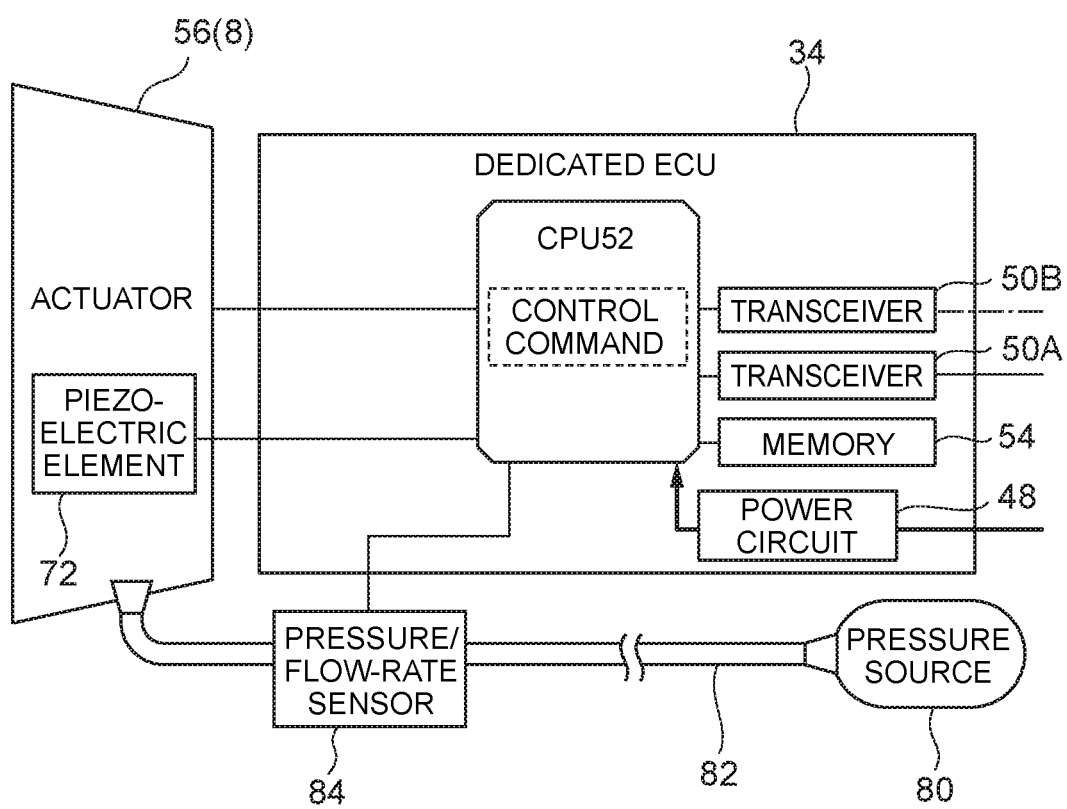
FIG. 13 is a block diagram of the configuration of a dedicated ECU according to the fourth embodiment.

Next, with reference to FIG. 13, the fourth example will be described. FIG. 13 is a block diagram of the configuration of the dedicated ECU 34 according to the fourth example.

In the above embodiments, the turbocharger is provided with the actuator 56 that can be driven by driving power (electric energy) supplied from the power supply line 74. Instead, in the fourth embodiment, the turbocharger 2 including the actuator 56 that can be driven by pressure energy will be described.

The fourth embodiment includes a pressure source 80 that can compress and accumulate a fluid that comprises gas or liquid, a flow path 82 for supplying the compressed fluid supplied from the pressure source 80 to the actuator 56, and a pressure sensor 84 disposed in the flow path 82. The actuator 56 is driven by pressure energy of the compressed fluid supplied via the flow path 82, and thereby is capable of operating the nozzle mechanism 22.

While the supply energy (electric energy) to the actuator 56 is detected on the basis of the electric value obtained by the current sensor 76 in the above second and third embodiments, the supply energy (pressure energy) to the actuator 56 can be detected on the basis of the pressure value obtained by the pressure sensor 84. Further, the actuator 56 is provided with the piezoelectric element 72 similarly to the above described first to third embodiments, and can detect the load of the actuator 56 by obtaining the signal of the piezoelectric element 72.

Accordingly, in the fourth embodiment, the actuator 56 is driven by supply energy other than electric energy, such as pressure energy. In this case, an abnormality can be determined on the basis of a control similar to that in the above second and third embodiments, by replacing the detection by the current sensor 76 with the detection by the pressure sensor.

The above control may be performed on the basis of the flow rate of the compressed fluid by using a flow rate sensor, instead of the pressure sensor 84.

As described above, according to the above described embodiment, it is possible to provide an abnormality determination device for a variable geometry turbocharger whereby it is possible to detect an abnormality of the nozzle mechanism 22 accurately at an early stage.

INDUSTRIAL APPLICABILITY

The present disclosure can be applied to an abnormality determination device for a variable geometry turbocharger including an actuator-driven variable nozzle mechanism.

DESCRIPTION OF REFERENCE NUMERALS

1 Engine (diesel engine)
2 Turbocharger
4 Exhaust manifold
6 Exhaust pipe
8 Exhaust turbine
10 Intake manifold
12 Intake pipe
14 Turbo compressor
16 Air cleaner
18 Inter cooler
30 Control system
32 Main ECU
34 Dedicated ECU
36 Power supply line
38 Abnormality diagnosis line
40 Network line
42, 48 Power circuit
44, 50 Transceiver
46, 52 CPU
47, 54 Memory
56 Actuator
58 First detection part
60 Second detection part
62 Determination part
64 Drive control part
66, 78 Map
68 Driving rod
70 Housing
72 Piezoelectric element
74 Power supply line
76 Current sensor
80 Pressure source
82 Flow path
84 Pressure/flow-rate sensor

The invention claimed is:

1. An abnormality determination device for a variable geometry turbocharger having a nozzle mechanism capable of changing a flow path area of exhaust gas with an actuator, the abnormality determination device comprising:

a first detection part configured to detect at least one of a load of the actuator and an amount of energy supplied to the actuator;

a determination part configured to determine that an abnormality is present, if a detection result by the first detection part is outside of an allowable range corresponding to an operational state of the variable geometry turbocharger:

a second detection part configured to detect the operational state of the variable geometry turbocharger; and a storage part configured to store a map which defines a relationship between the operational state of the variable geometry turbocharger and the allowable range, wherein the determination part is configured to set the allowable range corresponding to the operational state detected by the second detection part on the basis of the map, and wherein the map comprises a plurality of maps prepared corresponding to an opening degree of the nozzle mechanism.

2. The abnormality determination device for a variable geometry turbocharger according to claim 1, further comprising:

an energy sensor disposed in an energy supply path connecting an energy supply source and the actuator, wherein the first detection part is configured to detect the supply energy on the basis of a detection value of the energy sensor.

3. The abnormality determination device for a variable geometry turbocharger according to claim 1, wherein the operational state is determined including at least one of a boost pressure of the variable capacity turbocharger and the load of the actuator.

4. The abnormality determination device for a variable geometry turbocharger according to claim 1, wherein the supply energy is one of electric energy and pressure energy.

5. The abnormality determination device for a variable geometry turbocharger according to claim 1, further comprising:

a transmission part for sending a determination result by the determination part to a control unit for controlling an engine supercharged by the variable geometry turbocharger.

6. An abnormality determination device for a variable geometry turbocharger having a nozzle mechanism capable of changing a flow path area of exhaust gas with an actuator, the abnormality determination device comprising:

a first detection part configured to detect at least one of a load of the actuator and an amount of energy supplied to the actuator; and a determination part configured to determine that an abnormality is present, if a detection result by the first detection part is outside of an allowable range corresponding to an operational state of the variable geometry turbocharger:

wherein the first detection part is configured to detect both of the load of the actuator and the amount of energy supplied to the actuator, and wherein the determination part is configured to determine that an abnormality is present in an energy supply path to the actuator, if the load of the actuator is small with respect to the supply energy to the actuator.

7. An abnormality determination device for a variable geometry turbocharger having a nozzle mechanism capable of changing a flow path area of exhaust gas with an actuator, the abnormality determination device comprising:

a first detection part configured to detect at least one of a load of the actuator and an amount of energy supplied to the actuator;

a determination part configured to determine that an abnormality is present, if a detection result by the first detection part is outside of an allowable range corresponding to an operational state of the variable geometry turbocharger;

a housing to which a reaction force of the actuator is applicable; and a piezoelectric element interposed between the actuator and the housing, wherein the first detection part is configured to detect the load of the actuator on the basis of an output voltage of the piezoelectric element.

8. The abnormality determination device for a variable geometry turbocharger according to claim 7, wherein the actuator is connected to the nozzle mechanism via a rod member configured to be drivable along an axial direction, and wherein the piezoelectric element is disposed on an opposite side from a side of the actuator to which the rod member is connected.

* * * * *